(12) United States Patent
Hermann et al.

(10) Patent No.: US 7,039,513 B2
(45) Date of Patent: May 2, 2006

(54) CONTROL ARRANGEMENT AND METHOD FOR TESTING THE OPERATION OF A CONTROL ARRANGEMENT OF THIS TYPE FOR OCCUPANT PROTECTION MEANS IN A MOTOR VEHICLE

(75) Inventors: Stefan Hermann, Köfering (DE); Gerhard Mader, Thalmassing (DE); Claus Schmidt, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/535,218

(22) PCT Filed: Jan. 29, 2004

(86) PCT No.: PCT/EP2004/000809
§ 371 (c)(1),
(2), (4) Date: May 17, 2005

(87) PCT Pub. No.: WO2004/076242
PCT Pub. Date: Sep. 10, 2004

(65) Prior Publication Data
US 2006/0047392 A1    Mar. 2, 2006

(30) Foreign Application Priority Data
Feb. 28, 2003    (DE) ................. 103 08 881

(51) Int. Cl.
*B60R 22/00*    (2006.01)
(52) U.S. Cl. .................. 701/45; 701/34; 280/735
(58) Field of Classification Search ............ 701/45, 701/46, 47, 36, 31, 34, 35; 280/728.1, 734, 280/735; 180/273, 274, 281; 702/141
See application file for complete search history.

(56) References Cited

U.S. PATENT DOCUMENTS

| | | | |
|---|---|---|---|
| 6,023,664 A | | 2/2000 | Bennet |
| 6,678,599 B1 * | | 1/2004 | Eisele et al. ................ 701/45 |
| 6,711,485 B1 * | | 3/2004 | Feser et al. ................ 701/45 |
| 6,733,036 B1 * | | 5/2004 | Breed et al. ................ 280/735 |
| 6,756,889 B1 * | | 6/2004 | Sala et al. ................ 340/436 |
| 6,816,766 B1 * | | 11/2004 | Sala et al. ................ 701/45 |

FOREIGN PATENT DOCUMENTS

| | | |
|---|---|---|
| EP | 1 149 004 A1 | 10/2001 |
| WO | 00/41917 | 7/2000 |

* cited by examiner

Primary Examiner—Richard M. Camby
(74) Attorney, Agent, or Firm—Laurence A. Greenberg; Werner H. Stemer; Ralph E. Locher

(57) ABSTRACT

The invention relates to the idea of not initially multiplying the output signal (a) of an acceleration sensor (19) with regard to a weighted sum ($\Sigma_g$) with a correction factor ($k_w$) but to alter a test signal (t) by using a weighting means (16) in such a manner that an already weighted output signal ($a_g$) can be generated so that during a test operation, the safing algorithm of an evaluating device can be directly fallen back upon, whereby this can be advantageously tested with regard to its ability to operate. The invention is particularly suited for occupant protection systems of a modern motor vehicle.

23 Claims, 4 Drawing Sheets

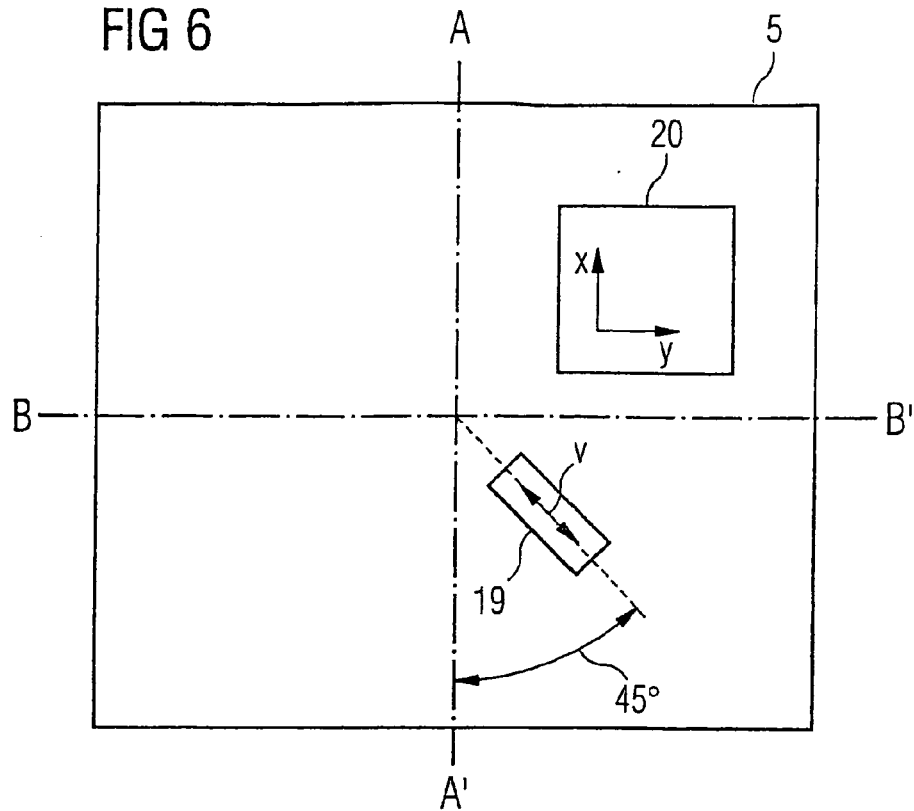
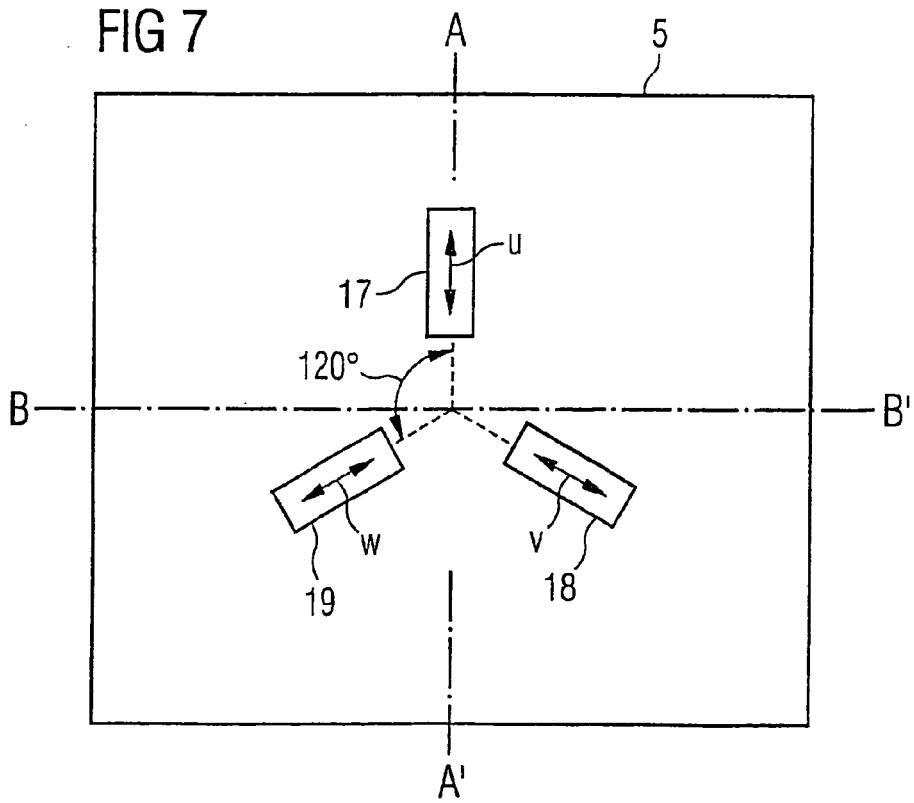

CONTROL ARRANGEMENT AND METHOD FOR TESTING THE OPERATION OF A CONTROL ARRANGEMENT OF THIS TYPE FOR OCCUPANT PROTECTION MEANS IN A MOTOR VEHICLE

BACKGROUND OF THE INVENTION

Field of the Invention

The invention relates to a control arrangement and a method for testing the operation of a control arrangement of this type for occupant protection means in a motor vehicle.

Occupant protection means such as airbags, belt tensioners, etc. represent important safety components in modern motor vehicles. They are not legally required but almost every automobile currently produced somewhere in the world has at least one front airbag for the driver.

In addition to the front airbag many automobiles now also have further different airbags, in particular side airbags, head airbags, knee airbags, etc. for the driver, front passenger or other occupants. Every one of these airbag systems uses a plurality of sensors, arranged at different points on the body of the vehicle, which identify the deceleration (negative acceleration) that occurs in the event of a collision. The systems generally used with driver, front passenger and side airbags operate with acceleration sensors arranged in or adjacent to a control arrangement. The control arrangement is located at a central point in the motor vehicle, for example under the driving seat or in the vehicle tunnel. It is therefore also frequently referred to as the central module. To identify a side collision, at least one acceleration sensor—or more progressively at least one pressure sensor—is provided on both sides of the motor vehicle, frequently referred to as so-called satellites due to their non-central position. The specifications for the respective sensors are generally relatively exacting, as they are the first component of an occupant protection system to receive crash information. They have to convert the rapid deceleration of the motor vehicle to a reliable and accurate electrical signal (a).

One of the most frequently used methods for measuring acceleration is to measure the action of a force F, which results from the acceleration g acting on a seismic mass m. This force generates mechanical stresses and a change in the length of the seismic mass. The stresses can be determined using the piezo-resistive (or piezo-electric) characteristics of the material used. Length changes are generally measured using a variable capacity. The piezo-resistive effect in semiconductors is utilized to a large degree in pressure sensors, while for acceleration sensors the capacitive measuring principle is preferred in a plurality of technical applications. This design allows very small sensor structures and therefore economical solutions to be produced using surface micromanufacturing. Sensors of capacitive structure are also less susceptible to temperature fluctuations and offer a wide operating temperature range. Therefore in the field of occupant protection systems both the acceleration sensors and the pressure sensors that are increasingly being used are based predominantly on this principle.

The actual sensor element or so-called g-cell in particular is a mechanical structure made of solid-state materials. It comprises for example two fixed plates with a movable plate between, which represents the seismic mass. If the g-cell is exposed to acceleration, the central plate moves from its rest position. When the central plate moves, its distance from one fixed plate increases to the same degree that its distance from the other fixed plate decreases. The change in distance is a measure of acceleration. The supports used to suspend the central plates act as springs. A fluid possibly compressed between the plates, for example a specific gas or even just air, cushions the movement. If this is not desirable it is known that a vacuum can be provided. A g-cell generally senses along a sensitivity axis. With an appropriate structure however one mass can be used for two axes, thereby reducing cost. Reference is then made to so-called x-y g-cells or x-y sensors. From an electrical point of view the plates of the g-cell form a linked capacitor pair. When the central plate moves along the sensitivity axis due to acceleration, the distance between the plates changes, as a result of which the capacity of each of the two capacitors also changes. The same also applies to g-cells with for example a plurality of finger-shaped, meshing elements.

The g-cells produced by micromanufacturing have very small dimensions. The seismic mass for example weighs only a few hundred picograms (1 picogram=$10^{-12}$ grams). When subject to an acceleration of 100 g, the movable plate or finger changes position by less than 400 nm (nanometers). A capacity change $\Delta C$ of less than 1 femtofarad ($10^{-15}$ F) must be identified to achieve a measuring release of 1 g. To be able to measure such a small capacity, it is necessary to have a dedicated control circuit in the acceleration sensor to convert the capacity to an analyzable output signal (a).

The output signal (a) of the sensor is supplied to an evaluation unit, which comprises at least one but currently generally more than one microcontroller, which then execute(s) a crash discrimination algorithm, to differentiate between an actual collision and the normal dynamic vehicle response and if necessary generates a release signal for the restraint means.

The release signal is at present frequently only generated as a function of a so-called switch signal, which can in the simplest instance originate from a mechanical acceleration switch. However in many acceleration sensor arrangements today one of the acceleration sensors themselves carries out this task. After executing the so-called saving (sic) algorithm, for which a dedicated microcontroller is now regularly provided in the evaluation unit, such so-called safing sensors are responsible for the releasing or preventing the release of the restraint means, if the acceleration sensor or the evaluation device, i.e. the algorithms executed in the microcontrollers, operate incorrectly and would therefore supply an incorrect release signal.

EP 1 149 004—the disclosure of which should be deemed to be specifically included in full—discloses a method and a device for testing the operation of a control arrangement for occupant protection means in a motor vehicle, with which a weighted sum is created from the output signals of the acceleration sensors to test the plausibility of the signals, by multiplying at least the output signal of one acceleration sensor by a correction value. Such a test advantageously allows information to be obtained about the operational capacity of the acceleration sensors, their signal output, levels, etc. But information cannot be obtained about the extent to which the safing algorithm itself operates reliably, because this is not referred back to in test mode.

SUMMARY OF THE INVENTION

The object of the invention is to provide an improved method for testing the operation of a system of a plurality of acceleration sensors in a control arrangement for occupant protection means in a motor vehicle. It should in particular be possible to test the operational capacity of the safing algorithm as well as the sensors.

This object is achieved according to the invention by a circuit arrangement with the features according to claim 1 and by a method for testing its operation with the features according to claim 7.

The idea behind the present invention is not initially to multiply the output signal (a) of an acceleration sensor by a correction value ($k_w$) in respect of a weighted sum ($\Sigma_g$) but to use a weighting means to modify a test signal (t) such that an already weighted output signal ($a_g$) can be generated, so that the safing algorithm of an evaluation device can be referred back to directly in test mode, as a result of which said safing algorithm itself can advantageously be tested in respect of its operational capacity.

Advantageous embodiments and developments, which can be used individually or in combination with each other, are set out in the dependent claims.

BRIEF DESCRIPTION OF THE DRAWINGS

Further advantages of the invention and its developments are described in more detail below with reference to exemplary embodiments and the drawing, in which:

FIG. 6 shows a schematic illustration of an alternative sensor alignment in the arrangement according to FIG. 5; and FIG. 7 shows a schematic illustration of a star-shaped arrangement of three acceleration sensors.

DESCRIPTION OF THE PREFERRED EMBODIMENTS

Figure 1:
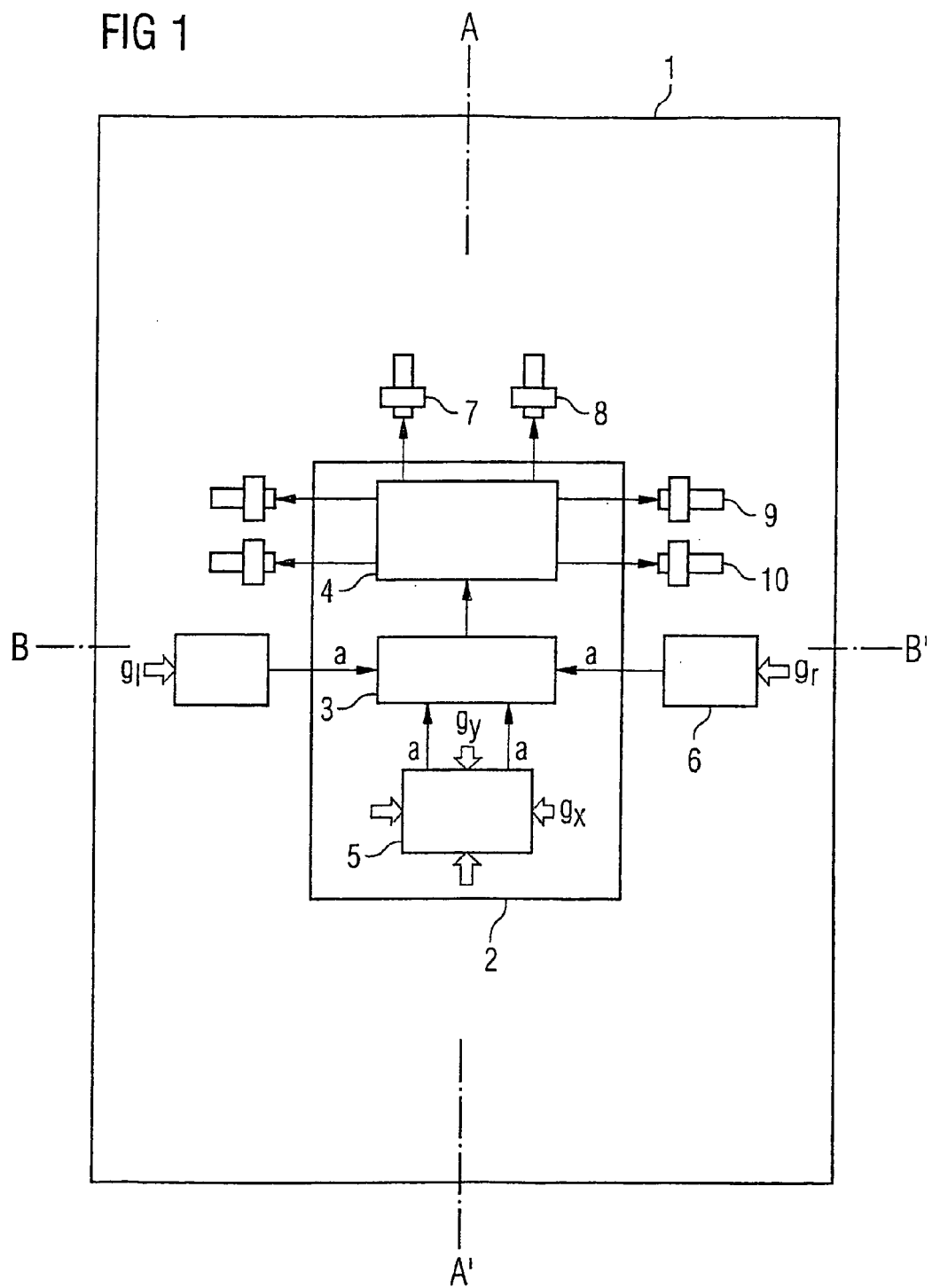
FIG. 1 shows a schematic illustration of the typical structure of an occupant protection system in a motor vehicle.

The same elements and signals are shown with the same reference characters in all the figures.

FIG. 1 shows the typical structure of an occupant protection system in a motor vehicle 1. A control arrangement 2 is located at the most central point possible in the motor vehicle 1. It has an evaluation unit 3 for example in the form of at least one microcontroller. In the control arrangement 2 or adjacent to it is a sensor field 5, in which appropriate sensors 17, 18, 19, 20 are arranged to measure acceleration, e.g. an acceleration $g_x$ along a sensitivity axis in the x-direction or an acceleration gy along a sensitivity axis in the y-direction. The sensitivity axes u, v, w, x, y of the sensors 17, 18, 19, 20 span a plane, which after the control arrangement 2 has been integrated in a motor vehicle 1 is essentially parallel to a plane defined by the longitudinal axis of the vehicle A–A' and the transverse axis of the vehicle B–B'. Further sensors 6, in particular to identify a side collision, are arranged toward the sides of the vehicle 1 at a non-central point, for the preferably capacitive measurement of lateral acceleration, e.g. an acceleration $g_r$ from the right or $g_l$ from the left. The sensors 6 for lateral integration are typically acceleration sensors but are now increasingly pressure sensors. The respective output signals a of the sensors are scanned by the microcontrollers arranged in the evaluation unit 3, one of which then executes a crash discrimination algorithm, to differentiate between an actual collision and the normal dynamic vehicle response. One microcontroller in the evaluation unit 3, which is preferably independent of crash processing, uses a safing routine to carry out continuous and/or cyclical diagnosis of the system, to ensure that it is operating correctly and is available in the event of an accident. The sensors 17, 18, 19, 20 arranged in the central sensor field 5, like those arranged at the sides 6, have to be extremely reliable so that they do not send the microcontroller 3 any incorrect signals a, which could result in unwanted activation of the restraint means. The driver is therefore notified of any fault, e.g. by means of an airbag warning light on the dashboard (not shown) and the restraint function is blocked until the error has been eliminated. If the airbags have to be deployed in the event of a collision, the evaluation unit 3 activates a trigger current switch 4, so that current flows through the trigger circuits of the trigger for the driver's front airbag 7, the trigger for the passenger's front airbag 8, the trigger for the side airbag 9, the trigger for the belt tensioner 10, etc., thereby activating the belt tensioners and activating the gas generation response within the inflation module.

Figure 2:
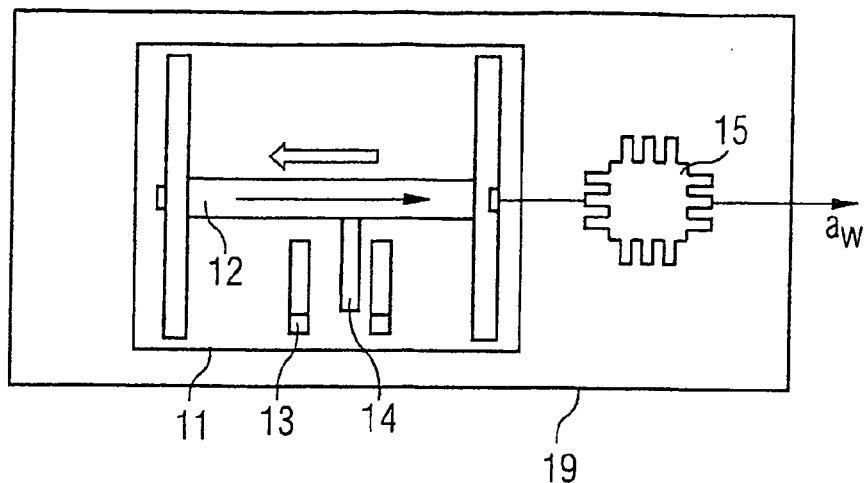
FIG. 2 shows a schematic illustration of an acceleration sensor comprising a seismic mass, which can be displaced along a sensitivity axis.

FIG. 2 shows the operating principle of a capacitive acceleration sensor 17, 18 or 19 comprising a sensor element 11—hereafter also referred to as the g-cell 11—in which a seismic mass is arranged in a fashion such that it can be displaced along a sensitivity axis w. The mode of operation is based for example on micromechanical twin-plate capacitors, which are predominantly finger-shaped. A central plate 14 is attached to the movable, suspended seismic mass 12 between two outer rigid plates 13. During acceleration the mass 12 moves so that the capacity changes. The arrangement of a plurality of finger-shaped, intermeshing elements one behind the other is also known. With an appropriate structure it is possible to use one mass 12 for two sensitivity axes (x, y), which advantageously reduces costs.

Figure 3:
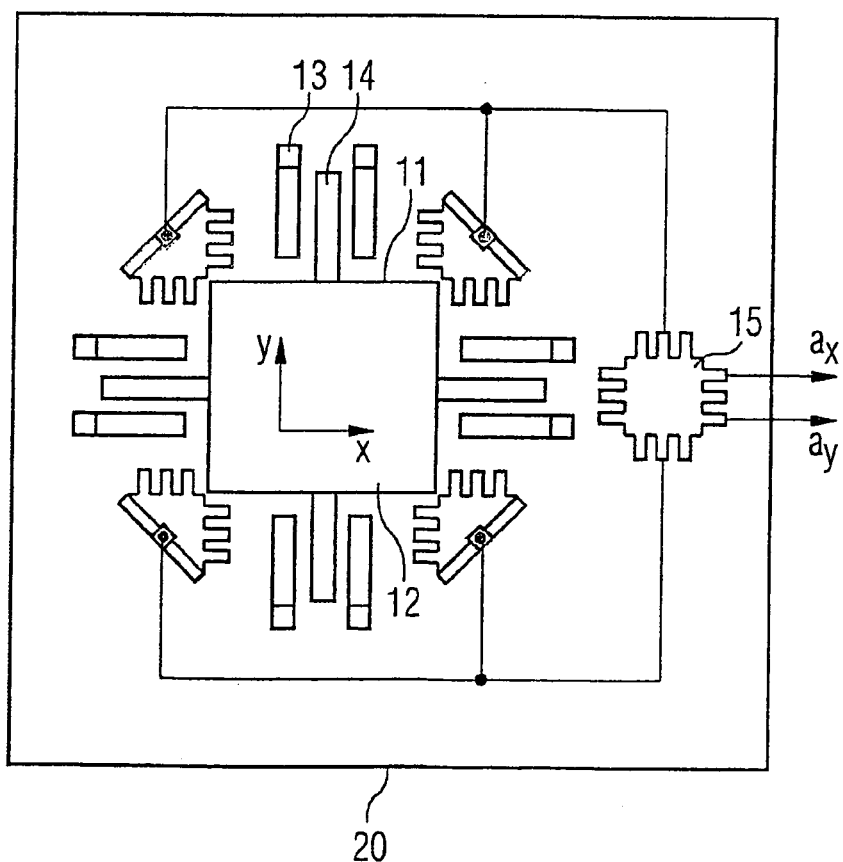
FIG. 3 shows a schematic illustration of an acceleration sensor, which can be displaced along two sensitivity axes.

FIG. 3 shows such a so-called capacitive x-y acceleration sensor comprising a sensor cell 11, in which a seismic mass 12 is arranged such that it can be displaced along two sensitivity axes x and y. As in the sensor according to FIG. 2, a dedicated control circuit 15 is arranged downstream from the g-cell 11, to convert the capacity to an analyzable output signal (a).

In normal, i.e. crash, mode of the evaluation device 3 all the output signals $a_u$, $a_v$, $a_w$ or $a_w$, $a_x$, $a_y$ of the sensors 17, 18, 19 or 19, 20 are tested for plausibility using a safing algorithm by creating a weighted sum $\Sigma_g$ from the output signals $a_u$, $a_v$, $a_w$ or $a_w$, $a_x$, $a_y$. Parallel to this for example the output signals $a_u$, $a_v$, $a_w$ or $a_w$, $a_x$, $a_y$ are analyzed using a crash discrimination algorithm, with any release of the restraint means only taking place once plausibility has been determined. According to the invention at least one of the output signals $a_u$, $a_v$, $a_w$ or $a_w$, $a_x$, $a_y$ is preferably compared beforehand with a threshold value SW, so that the safing algorithm is only released if at least one of the output signals $a_u$, $a_v$, $a_w$ or $a_w$, $a_x$, $a_y$ exceeds the threshold value SW.

In order to be able to test the error-free operation of the control arrangement 2 when starting and/or during operation of the motor vehicle 1, it is advantageous to be able to subject the acceleration sensors 17, 18, 19 or 19, 20 to a so-called automatic test. To this end, with the control arrangement 2 in test mode, the evaluation unit 3, for example of one microcontroller, sends a test signal t to at least two acceleration sensors 17, 18, 19 or 19, 20, to generate output signals $a_u$, $a_v$, $a_w$ or $a_w$, $a_x$, $a_y$, which serve to test the operation of the sensors 17, 18, 19 or 19, 20. In the case of a so-called physical test on the sensor(s) 17, 18, 19, 20 the test signal t brings about displacement of the seismic mass 12 along the sensitivity axis u, v, w, x, y. The capacity change in the g-cell 11 is identified in a control circuit 15 of the sensor 17, 18, 19, 20 downstream from the g-cell 11 and this knowledge is converted to an output signal a that can be used by the microcontrollers of the evaluation unit 3. Such a physical test advantageously allows information to be obtained both about the operational capacity of the g-cell 11 and about the operational capacity of the control circuit 15 of the acceleration sensor 17, 18, 19, 20.

It is also known that a test signal t is supplied only to the control circuit 15 of the acceleration sensor 17, 18, 19, 20, said test signal t also being used to generate or simulate an usable output signal a. However no information can be obtained about the operational capacity of the g-cell with such a purely electronic test. Information about the electronic operational capacity of the control circuit 15 of the sensor 17, 18, 19, 20 alone may in many instances suffice however, in particular when other mechanisms are provided to detect a defective g-cell, for example measurement of movement or fluctuations in the offset voltage of the sensor, in so far as these are characteristic of a defective g-cell.

Figure 4:
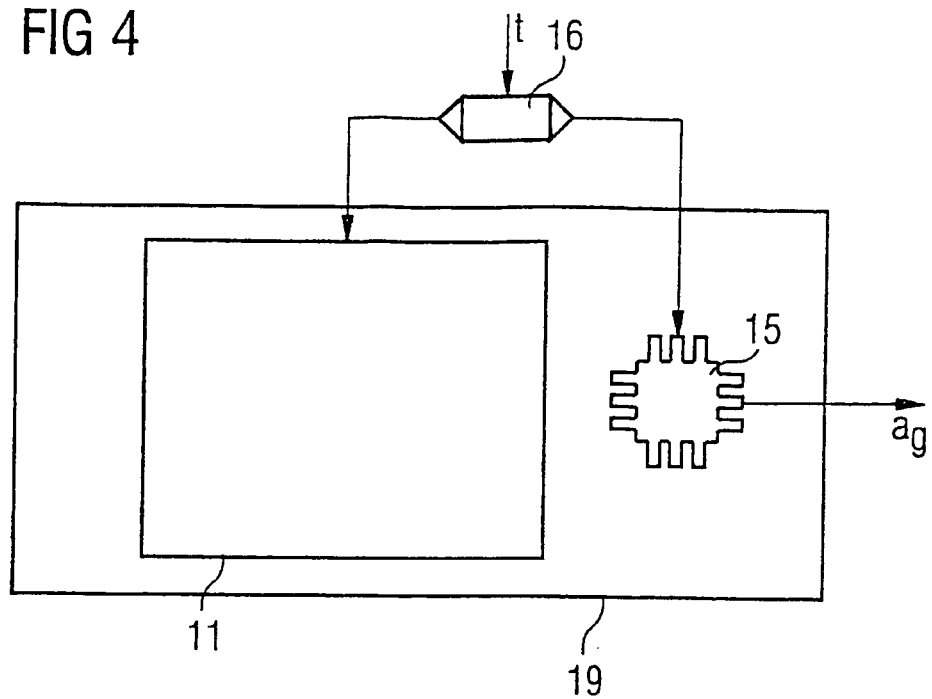
FIG. 4 shows a schematic illustration of the acceleration sensor according to FIG. 2 actively connected to a weighting means.

FIG. 4 shows an acceleration sensor 17, 18, 19 or 20 according to the invention. This is modified compared with the acceleration sensor according to FIG. 2 to the extent that it is also actively connected to a weighting means 16. The weighting means 16 can be part of the sensor 17, 18, 19, 20 and/or part of the control arrangement 2, in particular part of the evaluation device 3. This advantageously allows a test signal t from the evaluation unit 3 to be modified such that in the case of a physical test a correspondingly weighted displacement of the seismic mass 12 itself takes place. Weighting means in this instance are in particular so-called test fingers, etc. configured separately in the sensor. During an automatic test only the test fingers experience displacement. Being arranged on the same seismic mass, their displacement also brings about displacement of the fingers provided for crash sensing. A larger or smaller number of test fingers is displaced, depending on the degree of weighting required for an output signal. If then—by way of an illustration—fourteen or even just seven test fingers are displaced instead of the standard ten test fingers for example, this causes a correspondingly larger or smaller displacement of the fingers provided for crash sensing and a correspondingly weighted output signal. An electronic test is also possible, in that the weighting means 16 supplies an attenuated or amplified, i.e. weighted, test signal $t_g$ to the control circuit 15. The weighting means 16 can therefore be voltage-reducing electronic components such as resistors or voltage-increasing electronic components such as an electronic charging pump, etc. Compared with unmodified acceleration sensors, such an acceleration sensor 17, 18, 19, 20 comprising a weighting means 16 allows a weighted output signal $a_g$ to be output when the same automatic test signal t is received from all sides.

The present invention utilizes this consideration, in that it provides at least one sensor 19, which outputs a weighted output signal $a_g$. The generation of a plurality of weighted output signals $a_{ug}$, $a_{vg}$, $a_{wg}$, $a_{xg}$, $a_{yg}$ is expedient depending on the arrangement of the acceleration sensors. Different arrangements, preferred according to the invention, are shown in FIGS. 5 to 7.

Figure 5:
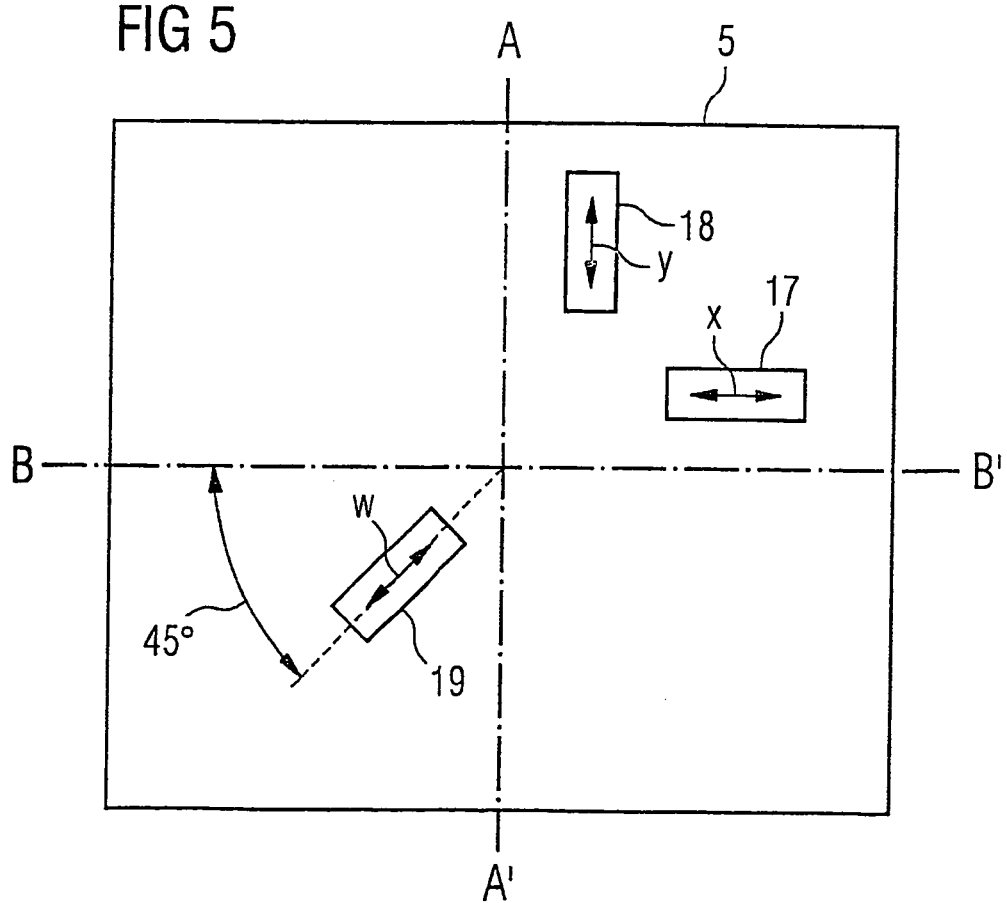
FIG. 5 shows a schematic illustration of an arrangement with an x-y acceleration sensor and a further acceleration sensor.

FIG. 5 shows the sensor field 5 of a control arrangement 2 comprising three acceleration sensors 17, 18, 19, each with a g-cell, which allow the sensing of an acceleration g along a sensitivity axis w, x, y, aligned differently in each instance. Sensor 17 serves to sense in x-direction, sensor 18 in y-direction. Sensor 19 is arranged at an angle to these. In crash mode the direction and strength of an acceleration g acting on the vehicle 1 can be detected in the downstream evaluation device 3 using only two of the three acceleration sensors 17, 18. The signal $a_w$ of the third acceleration sensor 19 is hereby used to test one of the two calculated variables, the direction or strength of the acceleration acting on the vehicle 1. The third sensor 19 thereby assumes the function of a safing sensor and can in this manner prevent the triggering of the restraint means 7, 8, 9, 10 at least indirectly, if the value supplied by it differs significantly from a value calculated from the signals $a_x$ and $a_y$ of the two other sensors.

In the example the sensors 17 and 18 are unmodified and commercially available, i.e. on receipt of a test signal t with the control arrangement 2 in test mode they generate an unweighted output signal $a_x$ or $a_y$. Sensor 19 is an acceleration sensor 19 structured according to the invention and actively connected to a weighting means 16. Its sensitivity axis w is arranged in the sensor field 5 at an angle to the sensitivity axis of the x-sensor or y-sensor 18 or 17, for example at 45° to the transverse vehicle axis B–B' corresponding to the x-axis. The weighting means 16 modifies the same test signal t according to a presetting such that a specifically weighted output signal $a_g$ is generated.

A first test specification for the sensor arrangement according to FIG. 5 provides for pairs of tests on the sensors, such that an unweighted output signal of either the sensor 17 sensing in the x-direction or the sensor 18 sensing in the y-direction is considered together with the weighted output signal of the so-called safing sensor 19. In particular the seismic mass 12 of the sensor element 11 of the first acceleration sensor 19 is displaced with weighted force in the opposite direction to its sensitivity axis w or a corresponding signal $a_{wg}$ is generated electronically. The seismic mass 12 of the sensor element 11 of the second acceleration sensor 17 or 18 is also displaced with unweighted force in the direction of its sensitivity axis x or y or a corresponding signal $a_x$ or $a_y$ is generated electronically. A reverse process is also possible, i.e. the generation of a weighted output signal $a_x$ or $a_y$ in the x-direction or y-direction and an unweighted signal $a_w$ for the w-direction. In the first-mentioned instance the weighting means 16 should preferably modify the test signal t such that the electrical output signal $a_{wg}$ is output weighted by the, mathematically expressed, weighting factor $k_w$ equal to $\frac{1}{2}*\sqrt{2}$ (corresponding to around 0.707). If the sensors are arranged at different angles to each other, the weighting factor should be adjusted as a function of the angle position.

According to a second test specification, all the output signals of the sensors 17, 18, 19 arranged in the sensor field 5 are considered together at the same time. In particular the seismic mass 12 of the sensor element 11 of the first acceleration sensor 19 is displaced with weighted force in the opposite direction to its sensitivity axis w or a corresponding signal $a_{wg}$ is generated electronically. The seismic masses 12 of the sensor elements 11 of the second acceleration sensor 17, 18 are also displaced with unweighted force in the direction of their sensitivity axis x and y or a corresponding signal $a_x$ and $a_y$ is generated electronically. In this instance the weighting means 16 should preferably modify the test signal t such that the electrical output signal $a_{wg}$ is output weighted by the, mathematically expressed, factor $k_w$ equal to $\sqrt{2}$ (corresponding to around 1.41). Possible alternatives should be deemed to be included as well.

FIG. 6 shows an alternative preferred sensor arrangement according to the invention. In contrast to the arrangement according to FIG. 5, instead of individual sensors 17 and 18 sensing in the x-direction and y-direction, a so-called x-y sensor 20 is provided. The sensitivity axis v of the safing sensor 19 is again arranged at an angle to these axes, in the present instance an angle of 45° to the longitudinal axis of the vehicle A–A' corresponding to the y-axis. The operational capacity of the control circuit 2 can also be tested in this arrangement according to the two text (sic) specifications described above.

Finally FIG. 7 shows a further preferred sensor arrangement according to the invention. In contrast to the arrangement according to FIG. 5, of the at least three individual sensors 17, 18, 19 sensing along a sensitivity axis u, v or w, a second sensor 18 is also arranged at an angle to the longitudinal axis of the vehicle A–A' or the transverse axis of the vehicle B–B', so that the acceleration sensors 17, 18, 19 each have differently aligned sensitivity axes u, v, w. The sensors 17, 18, 19 are preferably star-shaped, each arranged with a 120° offset. The operation of this arrangement is tested according to a third test specification, according to which all the sensors 17, 18, 19 arranged in the sensor field (5) are considered together at the same time, as described for the second test specification, in this instance the weighting means 16 having to modify the test signal t in respect of the safing sensor 19 such that the electrical output signal is output weighted by the, mathematically expressed, factor $k_w$ equal to 2.

Weighted and unweighted output signals from the acceleration sensors 17, 18, 19, 20 are processed in the microcontroller 3 using a safing algorithm, which again itself creates a weighted sum $\Sigma_g$. If processing produces a predefined value, for example approximately zero, this indicates that the safing algorithm itself is also operating reliably. If the predefined value is to be approximately zero, the factor $k_w$ should preferably be selected according to the invention such that the angle positions between the sensors ultimately find a balance.

The present invention therefore advantageously allows not only the operation of the g-cell 11 and/or the control circuit 15 of an acceleration sensor 17, 18, 19, 20 to be tested but also the operational capacity of a safing algorithm associated with the crash algorithm. The present invention is therefore particularly suitable for occupant protection systems in a modern motor vehicle.

The invention claimed is:

1. A control configuration for an occupant protection device in a motor vehicle, the control configuration comprising:
a sensor field having at least two acceleration sensors, said acceleration sensors having at least two sensor elements allowing acceleration sensing along three sensitivity axes;
said sensitivity axes of said sensor elements of said acceleration sensors spanning a plane, said plane, after integrating the control configuration in a motor vehicle, being substantially parallel to a plane defined by a longitudinal axis of the vehicle and a transverse axis of the vehicle;
at least one evaluation device including:
for a normal or crash mode:
a safing routine to test plausibility of all output signals of said sensors by creating a weighted sum from the output signals, and
a crash routine to evaluate the output signals; and
for a test mode:
a test routine sending a test signal to at least two of said acceleration sensors to generate output signals to test operation of said sensors;
at least one test signal to be modified with a weighting device by a predefinable weighting factor causing at least one of said acceleration sensors to output a weighted output signal; and
during the test routine, the output signals of said acceleration sensors disposed in said sensor field to be processed according to the safing routine;
the weighted sum of the output signals producing a predefined value when said acceleration sensors are capable of operation; and
error-free operation of the control configuration being able to be determined when the weighted sum of the output signals actually supplied during the test routine approximately produces the predefined value.

2. The control configuration according to claim 1, wherein said sensor field has three of said acceleration sensors each having a sensor element for one respective sensitivity direction.

3. The control configuration according to claim 1, wherein said sensor field has a first one of said acceleration sensors with a sensor element for a predefined sensitivity direction and a second one of said acceleration sensors with two sensor elements for two predefined sensitivity directions.

4. The control configuration according to claim 1, wherein said at least two acceleration sensors include a first acceleration sensor with a sensor element for a predefined sensitivity direction and a second acceleration sensor with a sensor element for two predefined sensitivity directions.

5. The control configuration according to claim 1, wherein said weighting device is part of at least one of said evaluation device or said acceleration sensors.

6. The control configuration according to claim 1, wherein said weighting device includes at least one of a plurality of test fingers, a voltage-reducing component such as a resistor, a voltage-increasing component such as a charging pump, another suitable electronic component, or another suitable mechanical component.

7. A method for testing operation of a control configuration for an occupant protection device in a motor vehicle, which comprises the following steps:
providing a sensor field including at least two acceleration sensors having at least two sensor elements allowing acceleration sensing along three sensitivity axes;
spanning a plane with the sensitivity axes of the sensor elements of the acceleration sensors, the plane, after integrating the control configuration in a motor vehicle, being substantially parallel to a plane defined by a longitudinal axis of the vehicle and a transverse axis of the vehicle;
providing at least one evaluation device:
in a normal or crash mode:
testing plausibility of all output signals of the sensors with a safing algorithm by creating a weighted sum from the output signals, and
evaluating the output signals with a crash discrimination algorithm; and
in a test mode:
sending a test signal to at least two acceleration sensors to generate output signals to test operation of the sensors;
subjecting at least one test signal to a weighting causing at least one acceleration sensor to output a weighted output signal; and in the test mode, processing the output signals of the acceleration sensors disposed in the sensor field according to the safing algorithm;

producing a predefined value with the weighted sum of the output signals when the acceleration sensors are capable of operation; and possibly determining error-free operation of the control configuration, when the weighted sum of the output signals actually supplied in the test mode approximately produces the predefined value.

8. The method according to claim 7, which further comprises comparing at least one of the output signals with a threshold value, and releasing the safing algorithm only when at least one of the output signals exceeds the threshold value.

9. The method according to claim 7, which further comprises supplying the at least one test signal to a control circuit of the sensors for electronically generating or simulating an output signal.

10. The method according to claim 7, which further comprises supplying the at least one test signal to the sensor elements of the sensors for displacing a seismic mass of the sensor elements in a predefined direction.

11. The method according to claim 7, which further comprises providing a safing sensor having a sensor element with a sensitivity axis disposed at an oblique angle, in particular at an angle of 45°, 135° or 225°, to two mutually perpendicular sensitivity axes.

12. The method according to claim 11, which further comprises providing two sensors each having a sensor element with a sensitivity axis being mutually perpendicular.

13. The method according to claim 11, which further comprises providing an x-y sensor having two sensor elements each with a sensitivity axis being mutually perpendicular.

14. The method according to claim 11, which further comprises providing an x-y sensor having a sensor element with two sensitivity axes being mutually perpendicular.

15. The method according to claim 7, which further comprises:

displacing seismic masses of two sensor elements in a predefined direction or generating or electronically simulating corresponding signals, by performing the following two steps in either order:

displacing the seismic mass of the sensor element of a first acceleration sensor with weighted force in a direction opposite to its sensitivity axis or generating or electronically simulating a corresponding signal, and displacing the seismic mass of the sensor element of a second acceleration sensor with unweighted force in a direction of its sensitivity axis or generating or electronically simulating a corresponding signal.

16. The method according to claim 15, which further comprises setting a weighting factor of half the root of two.

17. The method according to claim 7, which further comprises:

displacing seismic masses of three sensor elements in a predefined direction or generating or electronically simulating corresponding signals, by performing the following three steps in any order:

displacing the seismic mass of the sensor element of a first acceleration sensor with weighted force in a direction opposite to its sensitivity axis or generating or electronically simulating a corresponding signal;

displacing the seismic mass of the sensor element of a second acceleration sensor with unweighted force in a direction of its sensitivity axis or generating or electronically simulating a corresponding signal; and displacing the seismic mass of the second or a third sensor element of the acceleration sensors with unweighted force in a direction of its sensitivity axis or generating or electronically simulating a corresponding signal.

18. The method according to claim 17, which further comprises setting a weighting factor of the root of two.

19. The method according to claim 7, which further comprises providing a star-shaped configuration of three sensors each having a sensor element with sensitivity axes mutually disposed at an angle, in particular at an angle of 120°.

20. The method according to claim 7, which further comprises displacing the seismic masses of three sensor elements in a predefined direction or generating or electronically simulating corresponding signals.

21. The method according to claim 20, which further comprises setting a weighting factor of 2.

22. The method according to claim 7, which further comprises setting the weighted sum of the output signals to be approximately zero, for diagnosing error-free operation of the control configuration in the test mode.

23. The method according to claim 10, which further comprises performing a capacitive test displacement of the seismic mass of the acceleration sensors.

* * * * *